(12) United States Patent
Van Heesch et al.

(10) Patent No.: US 8,687,123 B2
(45) Date of Patent: Apr. 1, 2014

(54) VIDEO SIGNAL PROCESSING

(75) Inventors: Franciscus Hendrikus Van Heesch, Eindhoven (NL); Michiel Adriaanszoon Klompenhouwer, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 58 days.

(21) Appl. No.: 12/747,171

(22) PCT Filed: Dec. 12, 2008

(86) PCT No.: PCT/IB2008/055263
§ 371 (c)(1),
(2), (4) Date: Jun. 10, 2010

(87) PCT Pub. No.: WO2009/077957
PCT Pub. Date: Jun. 25, 2009

(65) Prior Publication Data
US 2010/0265402 A1 Oct. 21, 2010

(30) Foreign Application Priority Data

Dec. 17, 2007 (EP) .................................. 07123339

(51) Int. Cl.
*H04N 5/00* (2011.01)
*H04N 5/21* (2006.01)
*G06K 9/48* (2006.01)
*G06K 9/40* (2006.01)

(52) U.S. Cl.
USPC ........... 348/607; 348/625; 348/790; 348/441; 382/199; 382/275

(58) Field of Classification Search
USPC ................ 348/606, 607, 625, 627, 790, 441; 382/199, 275
See application file for complete search history.

(56) References Cited

U.S. PATENT DOCUMENTS

| 4,925,294 | A | * | 5/1990 | Geshwind et al. ............... 352/57 |
| 5,150,428 | A | * | 9/1992 | Leone et al. .................. 382/270 |

(Continued)

FOREIGN PATENT DOCUMENTS

| EP | 1357750 A2 | 10/2003 |
| EP | 1357750 A2 | 10/2006 |

(Continued)

OTHER PUBLICATIONS

Klompenhouwer, M.: "Comparison of LCD Motion Blur Reduction Methods Using Temporal Impulse Response and MPRT"; SID International Symposium Digest of Technical Papers, 2006, Vol. 37, Book 2, pp. 1700-1703.

(Continued)

*Primary Examiner* — Brian Yenke
(74) *Attorney, Agent, or Firm* — Bruce Greenhaus; Richard Bachand; Duane Morris LLP

(57) ABSTRACT

A video signal processing apparatus for processing a video signal comprises a receive unit (101, 103, 105) which receives the video signal comprising a sequence of pictures. A processing unit (107) applies a picture noise changing algorithm to the sequence of pictures and a variation unit (113) varies a spatial noise reduction setting for the picture noise changing algorithm between at least some consecutive pictures of the sequence of pictures in response to a predetermined variation rule. Specifically a set of picture manipulation processes (203, 205) with different spatial noise reduction characteristics may be provided and the variation unit (113) may select different picture manipulation processes in consecutive pictures. The approach may introduce high frequency noise flickering which is less perceptible to a viewer thereby reducing the perceived noise. The invention may in particular be applied to upconverted high picture rate video signals for hold type displays, such as Liquid Crystal Displays displays.

10 Claims, 3 Drawing Sheets

(56) References Cited

U.S. PATENT DOCUMENTS

| | | | |
|---|---|---|---|
| 5,206,729 A * | 4/1993 | Nakata et al. | 348/594 |
| 5,329,311 A * | 7/1994 | Ward et al. | 348/180 |
| 5,508,751 A * | 4/1996 | Nitta | 348/607 |
| 5,592,220 A * | 1/1997 | Ishii et al. | 348/220.1 |
| 5,636,295 A * | 6/1997 | Kim | 382/251 |
| 5,742,355 A * | 4/1998 | De Haan et al. | 348/607 |
| 5,799,111 A * | 8/1998 | Guissin | 382/254 |
| 5,903,680 A * | 5/1999 | De Haan et al. | 382/265 |
| 6,021,216 A * | 2/2000 | Sathe et al. | 382/166 |
| 6,381,364 B1 * | 4/2002 | Gardos | 382/173 |
| 6,462,790 B1 * | 10/2002 | Lowe et al. | 348/665 |
| 6,724,437 B2 * | 4/2004 | Funke et al. | 348/622 |
| 7,136,114 B2 * | 11/2006 | Zahm et al. | 348/731 |
| 7,145,607 B1 * | 12/2006 | Hui | 348/607 |
| 7,324,160 B2 * | 1/2008 | Yang | 348/542 |
| 7,693,343 B2 * | 4/2010 | Klompenhouwer et al. | 382/260 |
| 7,701,475 B2 * | 4/2010 | Aoki et al. | 345/690 |
| 7,738,038 B2 * | 6/2010 | Kempf et al. | 348/441 |
| 7,903,148 B2 * | 3/2011 | Yokoyama et al. | 348/222.1 |
| 7,970,234 B2 * | 6/2011 | Park et al. | 382/275 |
| 8,059,203 B2 * | 11/2011 | Sasai et al. | 348/622 |
| 8,213,675 B2 * | 7/2012 | Kim et al. | 382/100 |
| 8,345,775 B2 * | 1/2013 | Guo et al. | 375/240.25 |
| 2003/0006991 A1 * | 1/2003 | De Haan et al. | 345/473 |
| 2003/0052979 A1 * | 3/2003 | Soga et al. | 348/241 |
| 2004/0233334 A1 * | 11/2004 | Zhu et al. | 348/607 |
| 2005/0008245 A1 * | 1/2005 | Katougi et al. | 382/254 |
| 2005/0190164 A1 * | 9/2005 | Velthoven et al. | 345/204 |
| 2005/0207015 A1 * | 9/2005 | Jones et al. | 359/583 |
| 2005/0243205 A1 * | 11/2005 | Wredenhagen et al. | 348/448 |
| 2005/0248687 A1 * | 11/2005 | Lee et al. | 348/606 |
| 2006/0008154 A1 * | 1/2006 | Belle | 382/232 |
| 2006/0061690 A1 * | 3/2006 | De Haan et al. | 348/625 |
| 2006/0176404 A1 * | 8/2006 | Fujii et al. | 348/607 |
| 2006/0183275 A1 * | 8/2006 | Schoner et al. | 438/166 |
| 2006/0221241 A1 * | 10/2006 | Okumichi et al. | 348/571 |
| 2006/0232709 A1 * | 10/2006 | Renner et al. | 348/607 |
| 2006/0262147 A1 * | 11/2006 | Kimpe et al. | 345/690 |
| 2006/0280249 A1 * | 12/2006 | Poon | 375/240.16 |
| 2007/0103594 A1 * | 5/2007 | Zhu et al. | 348/607 |
| 2007/0229709 A1 * | 10/2007 | Asamura et al. | 348/607 |
| 2007/0258653 A1 * | 11/2007 | Van Heesch et al. | 382/248 |
| 2008/0122953 A1 * | 5/2008 | Wakahara et al. | 348/241 |
| 2008/0232458 A1 * | 9/2008 | Spektor et al. | 375/240.01 |
| 2008/0252789 A1 * | 10/2008 | Sawa | 348/607 |
| 2010/0214486 A1 * | 8/2010 | Sasaki | 348/607 |

FOREIGN PATENT DOCUMENTS

| | | |
|---|---|---|
| EP | 1708491 A2 | 10/2006 |
| WO | 0135636 A1 | 10/2006 |

OTHER PUBLICATIONS

Van Heesch et al: "Video Processing for Optimal Motion Portrayal on LCDs"; Proceedings of the IDW, 2006, pp. 1993-1996.

* cited by examiner

VIDEO SIGNAL PROCESSING

FIELD OF THE INVENTION

The invention relates to processing of a video signal and in particular, but not exclusively, to processing of a video signal for presentation on a sample and hold type display or on a display with increased frame rate.

BACKGROUND OF THE INVENTION

A type of displays often used for presenting video signals (such as television) are known as (sample and) hold type displays. An example of a hold time display is Liquid Crystal Displays (LCDs) which are used in many current televisions. For most LCD television and displays, hold times are typically 20 msec.

In contrast to conventional Cathode Ray Tube (CRT) displays wherein an electron beam sweeps the surface of a cathode ray tube to light any given part of the screen only for a miniscule fraction of the frame time, the image of a hold type display is sampled and held constant for the entire frame time. The hold effect corresponds to a time domain filtering by a finite impulse response filter having a square impulse response with a duration equal to the frame time. As this corresponds to a frequency domain low pass filtering (with a sin x/x pulse shape), the sample and hold approach can significantly reduce the temporal bandwidth resulting in significantly reduced dynamic performance and in particular in perceptible motion blur.

Thus, hold-type displays such as LCD displays are characterized by a high spatial bandwidth and low temporal bandwidth. This does not only affect the visibility of image details, but also affects the visibility of noise in video signals in several aspects. Firstly, noise is more visible on such displays (compared to e.g. CRTs) because the high spatial bandwidth means that there is no attenuation of high spatial frequencies by the display. Furthermore, the low temporal bandwidth not only introduces motion blur for moving objects in the image but also results in noise being increasingly perceptible to a user due to the long hold time for the individual frame.

The first aspect is addressed by using efficient noise reduction techniques that can reduce the spatial noise. Such noise reduction techniques typically include elements of spatial low pass filtering to reduce the high spatial bandwidth of the display (while at the same time seeking to maintain the sharpness associated with the high spatial resolution, for example by using edge preserving noise reduction algorithms).

In order to address motion blur, techniques have been introduced which seek to efficiently reduce the hold time for the video signal, corresponding to an increase in temporal bandwidth. Examples of such techniques are presented in "Comparison of LCD Motion Blur Reduction Methods using Temporal Impulse Response and MPRT", Michiel Klompenhouwer, Proceedings of the SID, 54.1, 2006. Such techniques can be divided in two categories: impulse driving (scanning backlight, black frame insertion, . . . ) and increased frame rate. Since the former will introduce large area flicker if the frame rate is not increased, state of the art motion blur reduction will first increase frame rate, and only then optionally apply impulse driving. Since no input video formats provide increased frame rate, state of the art motion blur reduction includes motion estimation with motion compensated frame rate up-conversion as for example described in "Video Processing for Optimal Motion Portrayal on LCDs", Frank van Heesch, Michiel Klompenhouwer, et. al, Proceedings of the IDW, 2006. Thus, in such a method, motion estimates are made for moving objects and the estimated motion compensation is introduced to interpolated upconverted frames thereby resulting in an increased frame rate and thus reduced hold time.

However, although such methods may increase the temporal bandwidth of hold-type displays for moving objects, it only reduces the motion blur for the components of the image itself and accordingly only improves the quality of the noise free video signal but does not improve the video noise. In particular, the effect of the hold time on video noise is not reduced. The underlying difference is that the noise free video signal is correlated between frames along the estimated motion direction (and therefore can be motion compensated in the interpolated upconverted frames), while noise is uncorrelated between frames. In other words: the temporal bandwidth of the video signal is increased by these methods, but the temporal bandwidth of the noise is not. This is true for an increased frame rate motion blur reduction system, even when a certain degree of impulse driving is applied. The visible effect of this is a so-called "dirty-window" effect, where the noise seems to be moving differently from the image signal.

Hence, an improved video signal processing would be advantageous and in particular a system allowing increased flexibility, reduced complexity, facilitated implementation, improved temporal performance (in particular for hold time displays), improved perceived video noise reduction, improved video quality and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a video signal processing apparatus for processing a video signal, the apparatus comprising: a receive unit for receiving the video signal comprising a sequence of pictures; a processing unit for applying a picture noise changing algorithm to the sequence of pictures; a variation unit for varying a noise reduction setting for the picture noise changing algorithm between at least some consecutive pictures of the sequence of pictures in response to a predetermined variation rule.

The invention may provide improved performance in many embodiments and may in particular allow improved perceived video quality for the video signal. In particular, for a hold type display, an increased noise flicker may be achieved resulting in a reduced noise perception to a viewer. An increased high frequency modulation of video noise in the presented image can be achieved thereby compensating for the temporal low-pass character of the display. The described approach may be compatible with other image quality improvement techniques such as spatial noise reduction to compensate for the high frequency response of a hold type display and/or motion blur compensation techniques.

Specifically, in many embodiments, the approach may reduce the visibility of noise by improving the temporal aspects of noise in a high frame rate noise polluted video signal (such as e.g. a television signal). This effect may be achieved with no or acceptable degradation to the perceived spatial sharpness of the video signal.

The approach may in many embodiments, transfer noise energy from lower frequencies to higher frequencies (resulting in noise flickering) where the noise is less perceivable by a viewer.

The picture noise changing algorithm may specifically be a noise reduction algorithm and/or may comprise one or more noise reduction processes and may in particular be a spatial noise reduction algorithm and/or may comprise one or more spatial noise reduction processes. The picture noise changing algorithm may include not performing any processing or not performing any noise reduction processing for one or more of the pictures.

The predetermined variation rule is independent of characteristics of the video signal and/or the characteristics of the sequence of pictures. Thus, a predetermined spatial noise reduction variation is introduced to the sequence of pictures thereby introducing noise flickering. The variation rule may for example specify that a random or predetermined variation of a bias is introduced to a spatial noise reduction process and/or that a random or predetermined alternation between different spatial noise reduction processes for consecutive pictures is introduced.

The predetermined variation rule may prescribe a periodical variation. Such a variation may have a fast variation frequency such as e.g. a period of less than 5 or 10 frames. The sequence of pictures may specifically be a sequence of frames, such as e.g. a sequence of upconverted frames, and/or may be a sequence of fields.

In accordance with an optional feature of the invention, the video signal processing apparatus of claim 1 further comprises: a set of picture manipulation processes, the picture manipulation processes of the set of executable picture manipulation processes having different noise reduction characteristics; and wherein the variation unit is arranged to select different picture manipulation processes from the set of picture manipulation processes as the picture noise changing algorithm for the at least some consecutive pictures.

This may provide particularly advantageous performance and/or may facilitate implementation.

The set of picture manipulation processes may specifically be a set of spatial noise reduction processes. The spatial noise reduction processes may have different spatial noise reduction characteristics because they use different algorithms and/or because they use different operational parameters. One spatial noise reduction process of the set may specifically correspond to no spatial noise reduction being performed.

The predetermined variation rule may for example prescribe a pseudo-random selection of a picture manipulation process from the set of picture manipulation processes for each consecutive picture.

In accordance with an optional feature of the invention, the predetermined variation rule comprises a predetermined alternating sequence for the different picture manipulation processes.

This may provide particularly advantageous performance and/or may facilitate implementation.

The predetermined variation rule may for example prescribe a predetermined periodic selection pattern for selecting a picture manipulation process from the set of picture manipulation processes for consecutive pictures. The selection pattern may be repeated and may advantageously have a period of less than 5 or 10 pictures and/or a period corresponding to an upconversion factor used to generate the consecutive pictures. The number of picture manipulation processes in the set of executable picture manipulation processes for consecutive pictures may be identical to the upconversion rate and/or the period of the predetermined periodic selection pattern.

The predetermined alternating sequence/selection pattern may be independent of the video signal and/or picture characteristics. The spatial noise reduction properties of the individual picture manipulation process may depend on characteristics of the video signal and/or picture characteristics. For example a first picture manipulation process may have a given dependence on a picture characteristic (e.g. a weighting of a noise estimate for the picture) and a second picture manipulation process may have a different dependence on the same picture characteristic (e.g. a different weighting of the noise estimate of the picture) and the predetermined alternating sequence may e.g. prescribe that these processes are alternated for consecutive pictures thereby introducing temporal noise flickering.

In accordance with an optional feature of the invention, the video signal processing apparatus further comprises: a noise estimator for generating a noise estimate for a first picture of the at least some consecutive pictures; and wherein at least a first picture manipulation process of the set of picture manipulation processes is arranged to adjust a noise reduction characteristic in response to the noise estimate when the first picture manipulation process is applied to the first picture.

This may provide particularly advantageous performance and/or may facilitate implementation. In particular, it may allow adaptation of the spatial noise reduction to the current need for the individual picture thereby resulting in improved image quality for the picture.

In accordance with an optional feature of the invention, at least one picture manipulation process of the set of picture manipulation processes is an edge preserving spatial noise reduction process.

This may provide particularly advantageous performance and/or may facilitate implementation. In particular, it may allow an improved image quality with reduced spatial noise, increased noise flickering and thus reduced perception of noise while at the same time providing a high perceived spatial resolution.

In accordance with an optional feature of the invention, the picture manipulation processes of the set of picture manipulation processes are spatial noise reduction processes.

This may provide particularly advantageous performance and/or may facilitate implementation. In particular, this may lead to an efficient, low complexity and/or high performance video signal processing which may be particularly suitable for hold type displays.

In accordance with an optional feature of the invention, the video signal processing apparatus further comprises a frame rate upconverter arranged to generate the sequence of pictures as a sequence of upconverted frames generated from a lower frame rate video signal.

This may provide particularly advantageous performance and/or may facilitate implementation.

In particular, the combination of the upconversion and introduction of noise flickering can provide an improved perceived image quality wherein the perceived frame/video spatial noise is substantially reduced. Specifically, the upconversion can allow high frequency spatial noise flickering to be introduced to conventional frame rate systems (which typically have frame rates in the order of 50 Hz corresponding to 20 ms frame times) thereby allowing the flickering to be masked from the perception of the user while still maintaining the perceived noise reduction effect.

In accordance with an optional feature of the invention, the predetermined variation rule prescribes increasing spatial noise reduction for an increasing difference in time between an upconverted frame of the sequence of upconverted frames and an original frame.

This may provide particularly advantageous performance and/or may facilitate implementation. In particular, it may provide reduced noise being perceived by a user watching the compensated video signal.

In accordance with an optional feature of the invention, the at least some upconverted frames are original frames of the lower frame rate video signal and the predetermined variation rule prescribes applying less spatial noise reduction to the at least some upconverted frames than to unconverted frames not being original frames of the lower frame rate video signal.

This may provide particularly advantageous performance and/or may facilitate implementation. In particular, it may provide reduced noise being perceived by a user watching the compensated video signal.

In accordance with an optional feature of the invention, a noise reduction setting variation introduced by the variation unit is independent of characteristics of the at least some consecutive pictures.

This may provide particularly advantageous performance and/or may facilitate implementation.

In accordance with an optional feature of the invention, the predetermined variation rule is such that a variation frequency of the spatial noise reduction setting is above 30 Hz.

This may provide particularly advantageous performance and/or may facilitate implementation. In particular, it may allow the flickering of noise to only be perceived as a noise reduction thereby resulting in an improved perceived video quality. In particular, the predetermined variation rule may be set such that the variation frequency (and thus the noise flickering) is above e.g. a flicker perception frequency for a human user (being the frequency at which the user no longer perceives the flickering). The flicker perception frequency may be determined as a function of the display size, display brightness, typical viewing distance to the display, resolution of the display etc.

According to an aspect of the invention there is provided a video display apparatus comprising: a receiving unit for receiving a video signal comprising a sequence of pictures; a processing unit for applying a picture noise changing algorithm to the sequence of pictures to generate a modified video signal; a variation unit for varying a noise reduction setting for the picture noise changing algorithm between at least some consecutive pictures of the sequence of pictures in response to a predetermined variation rule; and a display for displaying the modified video signal.

According to an aspect of the invention there is provided a method of processing a video signal, the method comprising: receiving the video signal comprising a sequence of pictures; applying a picture noise changing algorithm to the sequence of pictures; and varying a noise reduction setting for the picture noise changing algorithm between at least some consecutive pictures of the sequence of pictures in response to a predetermined variation rule.

According to an aspect of the invention, there is provided a carrier containing software code, the software code enabling a processor to execute a method comprising steps of: receiving the video signal comprising a sequence of pictures; applying a picture noise changing algorithm to the sequence of pictures; and varying a noise reduction setting for the picture noise changing algorithm between at least some consecutive pictures of the sequence of pictures in response to a predetermined variation rule.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a hold type display and in particular to an LCD display. However, it will be appreciated that the invention is not limited to this application.

Figure 1:
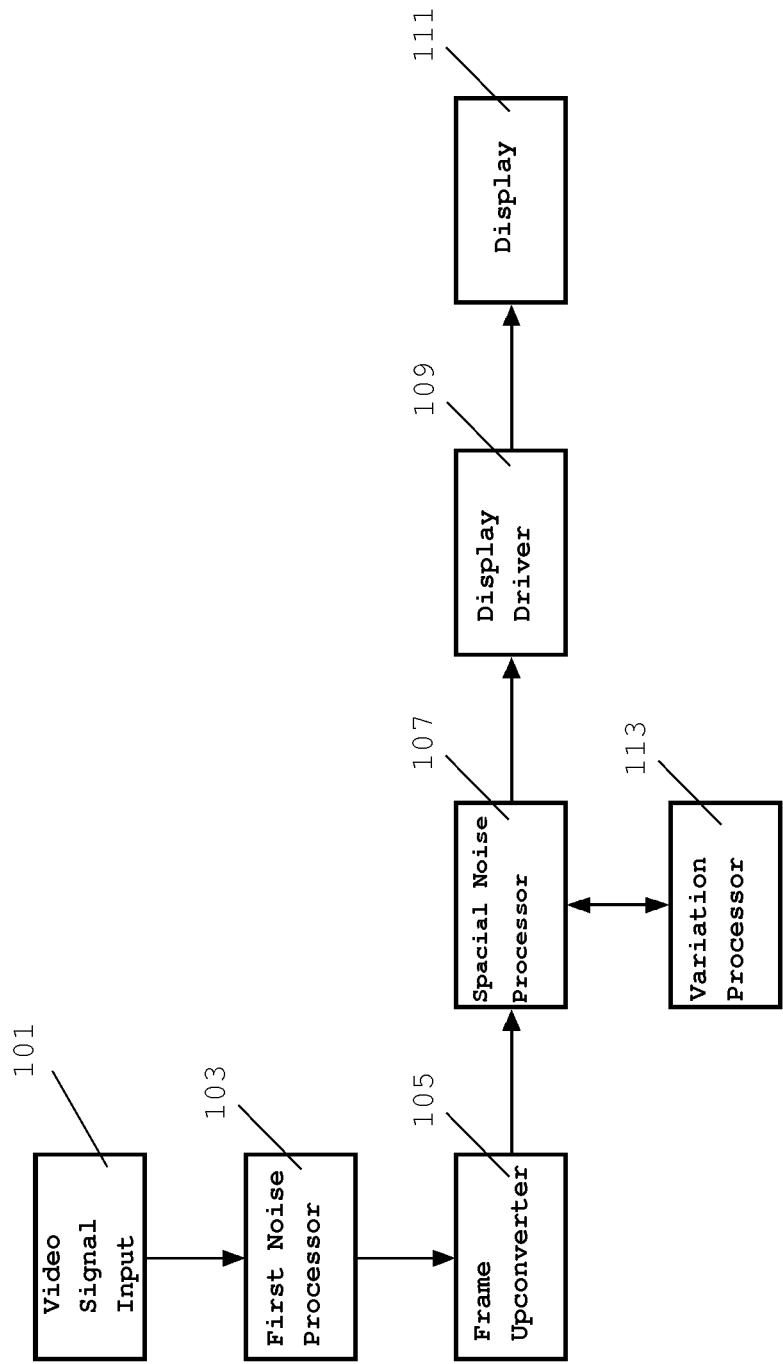
FIG. 1 illustrates an example of a display apparatus in accordance with some embodiments of the invention.

FIG. 1 illustrates an example of a LCD display apparatus in accordance with some embodiments of the invention. The LCD display apparatus specifically comprise a video signal processing apparatus in accordance with some embodiments of the invention.

The display apparatus comprises a video signal input 101 which receives a video signal comprising a sequence of pictures. The following description will focus on embodiments wherein each picture of the sequence of pictures is a frame but it will be appreciated that the sequence of pictures may alternatively or additionally include fields. In particular, the described principles and examples can readily be extended to processing of a sequence of fields, In the example, the video signal is a digital television signal received by a digital television receiver (not shown). The video signal can specifically be an MPEG 2 encoded video signal with a frame duration of 20 ms corresponding to a frame update rate of 50 Hz. The video signal may be received from any suitable source such as an external or internal source (e.g. a local video storage).

The video signal is fed from the video signal input 101 to a first noise processor 103 which is arranged to perform an initial noise reduction algorithm on the received video signal. For example, the first noise processor 103 may perform a spatial noise reduction process that reduces the high frequency spatial noise in the image while as far as possible maintaining object edges and transitions in the image.

The first noise processor 103 is coupled to a frame up converter 105 which performs a conversion of the video signal to generate an upconverted video signal having a higher frame rate. For example, the frame upconverter 105 may generate two output frames for each input frame, thereby increasing the frame rate to 100 Hz and reducing the frame duration to 10 ms.

It will be appreciated that the frame upconversion can be implemented using various techniques and algorithms known for frame upconverting. In particular, the new frames may be generated by interpolation between original frames of the video signal received from the first noise processor 103 and motion estimation and motion compensation may be performed for moving objects of the video image. As such, the frame upconverter 105 can reduce the motion blur for the noise free video image.

Thus, the frame upconverter 105 generates a video signal comprising a sequence of frames which specifically is a sequence of upconverted frames generated from a lower frame rate video signal received from the first noise processor

103. It will be appreciated that in some embodiments, the system will not include any frame upconversion but will e.g. operate directly on frames at the frame rate at which the video signal was generated or received.

The frame upconverter 105 is furthermore coupled to a spatial noise processor 107 which is arranged to apply a picture noise changing algorithm to the upconverted frames of the video signal received from the frame upconverter 105.

In the example, the spatial noise processor 107 is arranged to apply a spatial noise reduction to the upconverted frames. The use of both an initial spatial noise reduction performed at the original lower frame rate and a subsequent spatial noise reduction performed at the upconverted frame rate allows an improved overall noise reduction to be performed. In particular, the initial noise processing by the first noise processor 103 can remove noise prior to the upconversion thereby reducing the additional introduction of noise and artefacts resulting from the upconversion process being applied to the noise. The spatial noise reduction performed on the upconverted frames may provide a very efficient spatial noise reduction as it is applied directly to the frames that will be displayed. For example, the spatial noise reduction applied to the upconverted frames can remove spatial artifacts introduced by the upconversion process by the frame upconverter 105.

The spatial noise processor 107 is coupled to a display driver 109 which is arranged to drive a display 111 which in the specific example is an LCD television display. Due to the upconversion by the frame upconverter 105 the hold time can be substantially reduced in comparison to the lower frame rate of the received signal. In the specific example wherein an upconversion by a factor of two is implemented, the hold time is reduced by a factor of two. Thus, the motion blur can be substantially reduced as the interpolation as well as the motion estimation and compensation performed by the frame upconverter 105 can result in the effective output frame update rate being doubled (since the upconverted frames represent the (estimated) image at intermediate times between the frame times of the original lower frame rate images and are not just repetitions of the original frames).

Furthermore, in the example, the spatial noise processor 107 is controlled by a variation processor 113 such that a spatial noise reduction setting of the frame processing performed by the spatial noise processor 107 is varied between at least some consecutive frames. Due to this variation, a variability or de-correlation of spatial noise between consecutive (upconverted) frames is introduced resulting in a noise flickering effect being introduced to the image. The effect of such a noise flickering can result in a substantially reduced noise perception by a user viewing the displayed output.

Specifically, it has been found that for a noise flickering frequency higher than a given threshold frequency, the human perception does not detect the individual higher frequency flickering, but rather perceives the noise to be reduced due to the introduced variation. In particular, it has been found that noise flickering is perceived as less noisy than if constant noise with the same level as the average of the noise flickering is presented.

In the specific example, the noise reduction may be varied between each upconverted frame resulting in a noise flickering frequency corresponding to the upconverted frame rate, i.e. with a 50 Hz flickering frequency (at a display rate of 100 Hz). This noise is perceived as being substantially reduced in comparison to maintaining the noise constant for the entire duration of the lower frame rate of 50 Hz.

The variation processor 113 varies the noise reduction setting in accordance with a predetermined variation rule. This rule is independent of any characteristics of the received video signal and/or the upconverted the signal (although the properties, characteristics and variables of the frame manipulation process itself may be dependent on such characteristics). Thus, the variation processor 113 introduces a noise flickering effect regardless of the characteristics of the video signals.

The predetermined variation rule may for example modify a bias to a spatial noise reduction algorithm for each consecutive frame. As a simple example, the spatial noise processor 107 may apply a spatial noise reduction process to each upconverted frame which includes a spatial low pass filtering. The bandwidth of this low pass filtering may be determined for each upconverted frame in response to a bias value provided by the variation processor 113. Thus, by varying this bias value between consecutive frames, the variation processor 113 can introduce noise flickering to the image. The variation of the bias value is predetermined and independent of any video signal characteristics. It will be appreciated that the bandwidth of the low pass filtering may also be determined in response to other parameters and characteristics including characteristics of the video signal or the individual frame to which the noise reduction is applied. For example, the bandwidth may also be determined in response to an estimate of the amount of spatial noise being present in the individual upconverted frame.

It will also be appreciated, that the variation processor 113 may not necessarily vary the noise reduction setting between all consecutive frames. For example, the variation may e.g. only be introduced for every other frame transition. However, in the specific embodiment, the noise reduction setting is changed for each frame transition as this results in a higher noise flickering frequency thereby increasing the noise reduction perceived by the user and reducing the perception of the noise flickering itself.

In the specific example, a noise flickering frequency of 50 Hz is achieved. In other embodiments, other noise flickering frequencies may be used. However, in many such embodiments, the variation may advantageously be such that the noise flickering frequency is above the human perception flicker rate threshold for the specific display associated with the processed video signal. For example, depending on the display size, resolution, typical viewing distance etc, a flicker rate threshold may be determined (as another example, experiments may be performed to obtain empirical values). The variation of the variation processor 113 can then be designed to be above this flicker rate threshold.

For most users and displays, a variation frequency above 30 Hz will result in the noise flickering not being perceived (or only being perceived to an acceptable degree). Accordingly, in many embodiments predetermined variation rule is such that a variation frequency of the spatial noise reduction setting is above 30 Hz.

In the specific example, the spatial noise processor 107 can execute frame manipulation processes selected from a set of frame manipulation processors. The frame manipulation processes have different spatial noise reduction characteristics and the variation processor 113 can vary the noise reduction setting by selecting different frame manipulation processes in consecutive frames.

Specifically, the set of frame manipulation processes can comprise a plurality of different spatial noise reduction processes. Each spatial noise reduction processes may use a different algorithm and/or have different parameter settings than other noise reduction processes. By selecting different spatial noise reduction processes having different noise reduction characteristics in consecutive frames, a low complexity and simple operation can be used to provide a very flexible and efficient noise flickering.

It will be appreciated, that the different noise reduction processes can include processes using different algorithms or approaches and/or can include processes using the same algorithm but with different noise reduction parameters (such as e.g. different spatial low pass filtering bandwidths). It will also be appreciated that one of the sets of noise reduction processes can be a null (or dummy) process which does not perform any processing and/or spatial noise reduction on the frame. Thus, one process may simply correspond to leaving the (upconverted) frame unchanged. The following example focuses on examples wherein the noise reduction processes are spatial noise reduction processes but it will be appreciated that in other embodiments, other noise reduction processes may be used.

Figure 2:
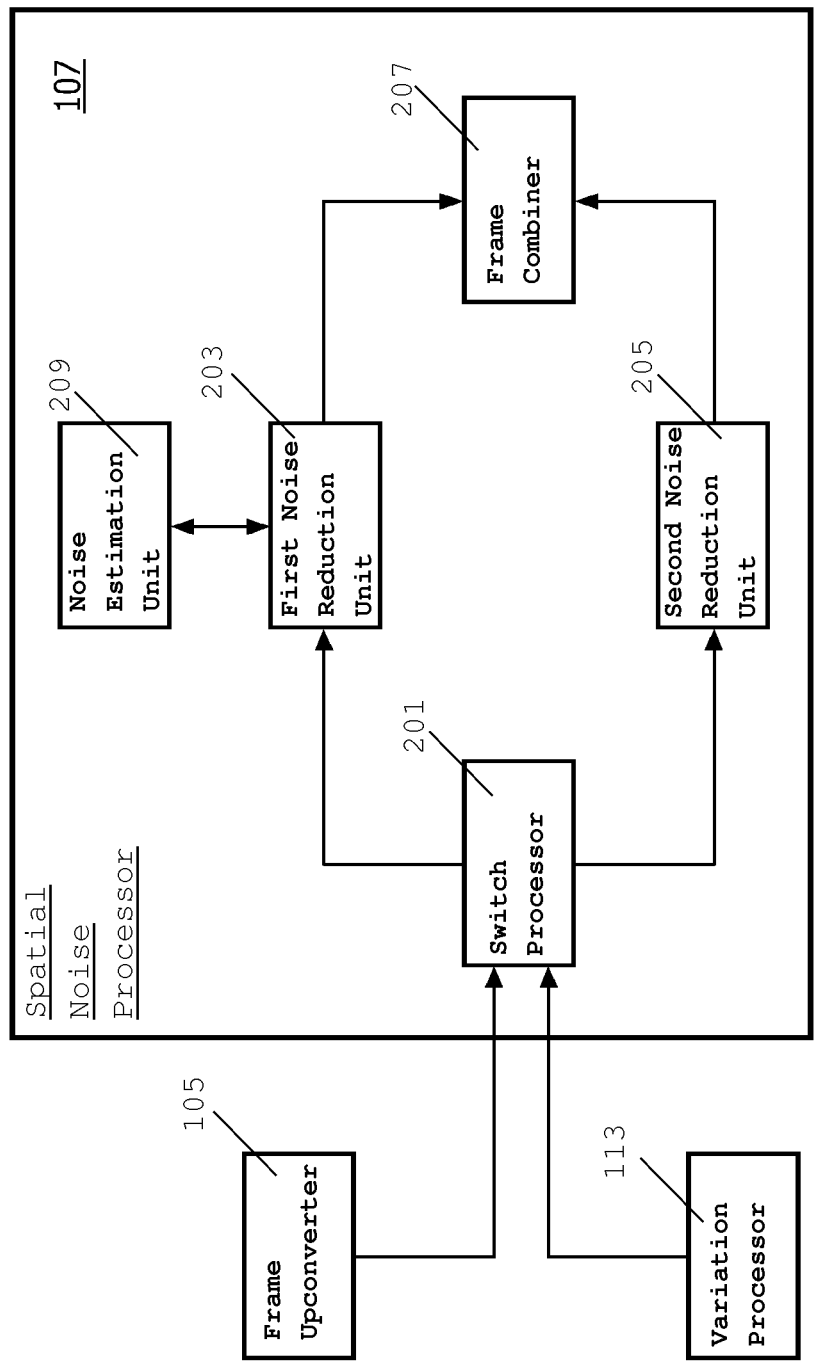
FIG. 2 illustrates an example of a video signal processing apparatus in accordance with some embodiments of the invention.

In the following, a specific example will be described with reference to FIG. 2 which illustrates the spatial noise processor 107 in more detail for an example wherein the set of spatial noise reduction processes contains two different spatial noise reduction processes, henceforth referred to as NR1 and NR2. NR1 and NR2 have different spatial noise reduction properties and specifically can be different spatial noise reduction algorithms and/or be the same basic spatial noise reduction algorithm used with different parameter settings.

In the example, the predetermined variation rule consists in a predetermined alternating sequence for the different spatial noise reduction processes. Thus, the variation processor 113 simply controls the spatial noise processor 107 to use different noise reduction processes for consecutive frames. In the specific example wherein the set of processes comprises only two processes, the variation processor 113 simply controls the spatial noise processor 107 to alternate between NR1 and NR2. Furthermore, in the example, the spatial noise processor 107 is controlled to switch to the other noise reduction process at every frame transition.

In the example, the spatial noise processor 107 comprises a switch processor 201 which is coupled to the frame upconverter 105 and the variation processor 113. The switch processor 201 is coupled to a first noise reduction unit 203 which is arranged to apply the first spatial noise reduction process NR1 to an upconverted frame. Furthermore, the switch processor 201 is coupled to a second noise reduction unit 205 which is arranged to apply the second spatial noise reduction process NR2 to an upconverted frame.

For each upconverted frame, the switch processor 201 decides which of the noise reduction units 203, 205 the frame should be fed to depending on the control signal received from the variation processor 113. In the specific example, the variation processor 113 simply controls the switch processor 201 to alternately feed the upconverted frame to the first noise reduction unit 203 and the second noise reduction unit 205.

The first noise reduction unit 203 and the second noise reduction unit 205 are coupled to a frame combiner 207 wherein a compensated video signal is generated by combining the individual upconverted frames resulting from the spatial noise reduction processing of either the first noise reduction unit 203 or the second noise reduction unit 205. This compensated video signal accordingly comprises a noise flickering effect and it is fed to the display driver 109 in order to be presented on the display 111.

It will be appreciated that in other embodiments, other rules for selecting between the available noise reduction processes may be used. For example, in some embodiments a random allocation of upconverted frames to one of the noise reduction units 203, 205 may be applied. This may result in a random noise flickering rather than a higher frequency periodically noise flickering which in some embodiments may be advantageous.

It will be appreciated, that any suitable noise reduction processes can be used without detracting from the invention. It will also be appreciated that a number of such noise reduction processes will be known to the person skilled in the art.

In the specific example, both noise reduction processes NR1 and NR2 are edge preserving spatial noise reduction processes. Thus, both noise reduction processes are arranged to preserve (as far as reasonably possible considering other conflicting requirements) the edges of objects in the image thereby ensuring that the combined video output image maintains a high edge resolution. In particular this may provide an improved overall sharpness impression to the user.

In the specific example, NR1 furthermore provides a (potentially significantly) stronger spatial noise reduction than NR2.

Thus, in the specific system, an input video sequence is up-converted to a higher display frame rate to obtain a high frame rate video signal.

For the high frame rate video signal, the consecutive frames are alternately noise reduced by NR1 or by NR2 and the resulting frames are combined to generate an output video sequence.

This output video sequence has the following characteristics:
  the frame rate is sufficiently high for the frame alternating detail flicker not to be visible,
  edges are preserved by NR1 and NR2 such that the overall sharpness impression is maintained, and
  noise is more strongly reduced (preferably completely eliminated) by NR1 relative to NR2, such that noise alternates on a frame-by-frame basis.

The visible result of this noise-alternating sequence is that the overall noise impression and the "dirty window" effect are reduced thereby providing a significantly improved video quality and user experience.

The proposed approach thus reduces the visibility of noise on hold-type displays by reducing the temporal low frequency components of the noise while increasing the high temporal frequency components which are less perceived by viewers. This effect is achieved by alternating the amount and/or type of noise reduction on a frame-by-frame basis. Furthermore, the resulting display rate is set so high that this detail flicker is not visible to the average user (preferably a display rate higher than ~80 Hz is used). In the specific example, a strong edge preserving (spatial) noise reduction process NR1 is alternated with a modest or no spatial noise reduction process NR2.

In the example, NR1 is characterized by a high noise reduction effect and an emphasis on noise reduction at the cost of loss of detail.

Furthermore, in the example, the exact noise reduction effect of NR1 is adjusted in response to the actual spatial noise in the processed frame. Accordingly, the first noise reduction unit 203 is coupled to noise estimation unit 209 which is arranged to generate a noise estimate for the frame and feed this to the first noise reduction unit 203 which then adjusts a spatial noise reduction characteristic for the frame in response to the noise estimate. Specifically, for an increased estimated spatial noise, an increased spatial noise reduction may be applied. For example, the bandwidth of a spatial low pass filtering of NR1 may be reduced for increasing noise estimates. It will be appreciated that any suitable spatial noise estimation method or algorithm may be used without detracting from the invention.

In the example, NR2 performs a much less severe spatial noise reduction and is characterized by an emphasis on preserving spatial detail and sharpness at the cost of a limited noise reduction.

Both NR1 and NR2 can be any type of known noise reduction method and can be different methods or identical methods with only a varying (e.g. threshold or noise strength) parameter.

An advantage of the described approach is that it can be applied independently of other noise reduction methods and especially of other noise reduction methods that do not take the temporal characteristics into account. For example, an initial spatial noise reduction process can be applied to the original lower frame rate video signal prior to the conversion.

It will also be appreciated that a desired level of average overall noise reduction can be achieved by selecting the noise reduction properties of the applied noise reduction processes appropriately. For example, to achieve a given overall average level of noise reduction in the specific example, the amount of noise reduction of NR1 can be selected to result in an overall noise reduction higher than the desired overall level while the amount of noise reduction of NR2 can be selected to result in an overall noise reduction lower than the desired overall level.

It will also be appreciated that the described approach could easily be extended to sets of more than two different spatial noise reduction processes (e.g. NR3, NR4, etc.).

In a video signal that has been upconverted, some frames may be closer to the low frame rate originals, or even identical to the originals, and some frames will be further away from the originals. Preferably, the noise reduction processes NR1 and NR2 are aligned such with the video signal, that the lower amount of noise reduction is applied as much as possible to frames close to, or identical to, the original frames, and such that the highest amount of noise reduction is applied to frames further away from the originals.

In the specific example, the upconversion is such that some of the upconverted frames directly correspond to some of the original frames. In some such embodiments, the predetermined variation rule prescribes applying less spatial noise reduction to upconverted frames that correspond to original frames than to upconverted frames which do not correspond to original frames but are interpolated frames. Such an approach will typically result in less artifacts as the interpolated frames typically can contain more artifacts then the original frames used to generate the interpolated frames. Therefore, applying a stronger noise reduction to the interpolated frames results in an overall higher video quality.

Thus, in the specific example wherein only two different noise reduction processes NR1 and NR2 are used, it is for an even frame rate up-conversion factor (e.g. 2, 4, etc) typically preferable to apply NR1 and NR2 such that NR2 is applied to the original frames as these typically contain more detail and less artefacts compared to the interpolated frames.

More generally, in case the frame rate up-conversion ratio is an even integer, i.e.:

m/n=2*i with i≠0 and i∈N, the up-conversion algorithm typically outputs a frame with a time stamp that matches the time stamp of an input frame, every m/n-th frame. Preferably these original frames are processed by a weaker noise reduction than for the interpolated frames. This is achieved in the example of FIG. 2 by properly initializing the alternation of the switch processor 201 as illustrated in the following table:

|  | Input frames | Up-conversion | Odd/even | Noise reduction |
|---|---|---|---|---|
| Time | IN(0) | → | E | NR2 |
|  |  | Interpolate 0, 1 | O | NR1 |
|  | IN(1) | → | E | NR2 |
|  |  | Interpolate 1, 2 | O | NR1 |
|  | IN(2) | → | E | NR2 |
|  |  | Interpolate 2, 3 | O | NR1 |
|  | IN(3) | → | E | NR2 |
|  |  | Interpolate 3, 4 | O | NR1 |

As a specific example, a 25 Hz film sequence can be upconverted with motion compensation to a 100 Hz frame rate. In this example, three interpolated frames are generated for each original frame. However, the noise characteristics of these interpolated frames are different and typically the interpolated frames midway between two original frames experiences less noise than the other interpolated frames due to the use of bi-directional interpolation. Accordingly, a different noise reduction process NR3 optimized for these noise characteristics can be used for the middle interpolated frame. This additional noise reduction process NR3 can for example be designed to result in the same output noise characteristics of the middle interpolated frame as for the original frames processed by the weaker noise reduction process NR2. As a result the noise level for such a system can alternate at a frequency of 50 Hz. An example of such a system is presented in the following table:

|  | Input frames | Up-conversion | Odd/even, phase | Noise reduction |
|---|---|---|---|---|
| Time | IN(0) | → | E, 0 | NR2 |
|  |  | Interpolate 0, 1 | O, 1 | NR1 |
|  |  | Interpolate 0, 1 | E, 2 | NR3 |
|  |  | Interpolate 0.1 | O, 3 | NR1 |
|  | IN(1) | → | E, 0 | NR2 |
|  |  | Interpolate 1, 2 | O, 1 | NR1 |
|  |  | Interpolate 1, 2 | E, 2 | NR3 |
|  |  | Interpolate 1, 2 | O, 3 | NR1 |

Figure 3:
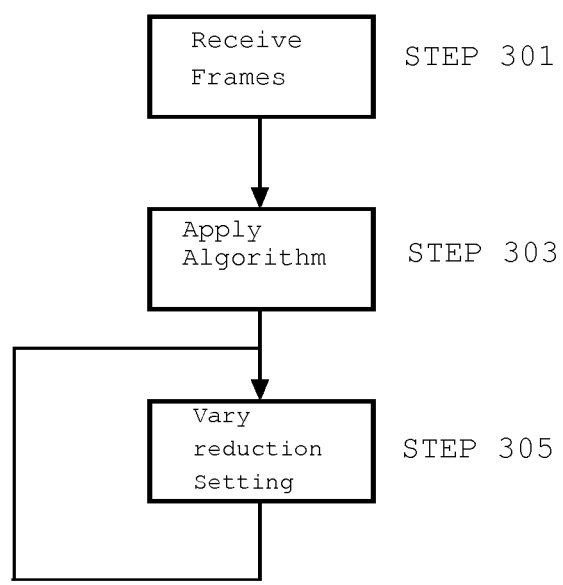
FIG. 3 illustrates an example of a method of processing a video signal in accordance with some embodiments of the invention

FIG. 3 illustrates a method of processing a video signal in accordance with some embodiments of the invention.

The method initiates in step 301 wherein a video signal comprising a sequence of frames is received.

Step 301 is followed by step 303 wherein a picture noise changing algorithm is applied to the sequence of frames.

Step 303 is followed by step 305 wherein a spatial noise reduction setting for the picture noise changing algorithm is varied between at least some consecutive frames of the sequence of frames in response to a predetermined variation rule.

In some embodiments a carrier containing software code that enables a processor to execute the method of FIG. 3 may be provided. The carrier may specifically comprise computer readable instructions which when executed by a computer or other suitable processing device causes the method to be performed. The term carrier should be construed as anything that can contain, for a certain amount of time, the code as physical parameters such as voltages. The term carrier may for example include entities such as: in-apparatus memory (such as a hard-disk or solid state memory), disconnectable memory (such as a disk or a memory stick or card), a connecting cable or other means of signal transportation, etc.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A video signal processing apparatus for processing a video signal, the apparatus comprising:
   a processing unit for applying a picture noise changing algorithm, the processing unit including:
   a switch unit having a first input for receiving the video signal, the video signal having a sequence of frames, a second input, a first output and a second output, the switch unit selecting, based upon a signal received at the second input, whether frames received at the switch unit input are to be directed to the first or second output;
   a first noise reduction unit having a input and an output, the input being coupled to the first output of the switch unit;
   a second noise reduction unit having an input and an output, the input being coupled to the second output of the switch unit; and
   a frame combiner having a first input and a second input, the first input coupled to the output of the first noise reduction unit and the second input coupled to the output of the second noise reduction unit;
   a variation unit for varying a noise reduction setting for the picture noise changing algorithm between at least some consecutive pictures of the sequence of pictures in response to a predetermined variation rule, wherein said varying is independent of the received pictures, the variation unit having an output coupled to the second input of the switch unit for providing signals to the switch unit which determine whether frames received by the switch unit are to be output via the first output of the switch unit or the second output of the switch unit, and thus varying the noise reduction setting.

2. The video signal processing apparatus of claim 1, wherein the first and second noise reduction unit each perform a set of picture manipulation processes, each picture manipulation process of the set of executable picture manipulation processes having a different noise reduction characteristic.

3. The video signal processing apparatus of claim 2 wherein the predetermined variation rule comprises a predetermined alternating sequence for the different picture manipulation processes.

4. The video signal processing apparatus of claim 2, wherein the processing unit further comprises:
   a noise estimator for generating a noise estimate for a first picture of the at least some consecutive pictures; and
   wherein at least a first picture manipulation process of the set of picture manipulation processes is arranged to adjust a noise reduction characteristic in response to the noise estimate when the first picture manipulation process is applied to the first picture.

5. The video signal processing apparatus of claim 2 wherein at least one picture manipulation process of the set of picture manipulation processes is an edge preserving spatial noise reduction process.

6. The video signal processing apparatus of claim 2 wherein the picture manipulation processes of the set of picture manipulation processes are spatial noise reduction processes.

7. The video signal processing apparatus of claim 1 further comprising a frame rate upconverter arranged to generate the sequence of pictures as a sequence of upconverted frames generated from a lower frame rate video signal.

8. The video signal processing apparatus of claim 7 wherein the predetermined variation rule prescribes increasing spatial noise reduction for an increasing difference in time between an upconverted frame of the sequence of upconverted frames and an original frame.

9. The video signal processing apparatus of claim 1 wherein a noise reduction setting variation introduced by the variation unit is independent of characteristics of the at least some consecutive pictures.

10. The video signal apparatus of claim 3 wherein the predetermined variation rule is such that a variation frequency of the noise reduction setting is above 30 Hz.

* * * * *